United States Patent
Kam et al.

(10) Patent No.: US 11,322,965 B2
(45) Date of Patent: May 3, 2022

(54) CHARGING CONTROL DEVICE AND METHOD

(71) Applicant: Samsung SDI Co., Ltd., Yongin-si (KR)

(72) Inventors: Jaewoo Kam, Yongin-si (KR); Yoonphil Eo, Yongin-si (KR); Junho Yun, Yongin-si (KR); Dongsu Ko, Yongin-si (KR); Hyomin Kim, Yongin-si (KR); Jae Shik Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 303 days.

(21) Appl. No.: 16/443,580

(22) Filed: Jun. 17, 2019

(65) Prior Publication Data
US 2020/0067325 A1 Feb. 27, 2020

(30) Foreign Application Priority Data
Aug. 21, 2018 (KR) .......................... 10-2018-0097582

(51) Int. Cl.
*H02J 7/00* (2006.01)

(52) U.S. Cl.
CPC ............ *H02J 7/007* (2013.01); *H02J 7/0026* (2013.01); *H02J 7/0029* (2013.01); *H02J 7/00302* (2020.01); *H02J 7/00308* (2020.01)

(58) Field of Classification Search
CPC ........ H02J 7/007; H02J 7/0026; H02J 7/0029; H02J 7/0068; H02J 7/0072; H02J 7/00302; H02J 7/00308

USPC ................................ 320/134, 136, 163, 164
See application file for complete search history.

(56) References Cited

U.S. PATENT DOCUMENTS

| 2007/0257642 | A1 | 11/2007 | Xiao et al. | |
|---|---|---|---|---|
| 2011/0169456 | A1* | 7/2011 | Wang | H02J 7/0031 320/134 |
| 2014/0225570 | A1* | 8/2014 | Suga | H02J 7/0091 320/134 |

(Continued)

FOREIGN PATENT DOCUMENTS

| JP | 2010-259240 A | 11/2010 |
|---|---|---|
| KR | 10-1472886 B1 | 12/2014 |
| KR | 10-1549360 B1 | 9/2015 |

(Continued)

OTHER PUBLICATIONS

EPO Extended Search Report dated Dec. 17, 2019, for corresponding European Patent Application No. 19181467.2 (7 pages).

(Continued)

*Primary Examiner* — Edward Tso
*Assistant Examiner* — Aaron Piggush
(74) *Attorney, Agent, or Firm* — Lewis Roca Rothgerber Christie LLP (57) ABSTRACT

A charging control device includes: a battery state detector configured to detect a cell voltage of at least one cell of a battery and a charging current between the battery and a charging device; and a controller configured to perform a cell over voltage protection (COVP) function on the battery based on a cell over voltage protection voltage, and to vary the cell over voltage protection voltage in response to the charging current.

16 Claims, 4 Drawing Sheets

(56) References Cited

U.S. PATENT DOCUMENTS

2016/0218531 A1*   7/2016   Li ...................... H02J 7/00308
2018/0048166 A1*   2/2018   Hsu ...................... H02J 7/0072

FOREIGN PATENT DOCUMENTS

KR   10-2017-0100135 A   9/2017
KR   10-2017-0142451 A   12/2017

OTHER PUBLICATIONS

EPO Office Action dated Nov. 19, 2021, issued in corresponding European Patent Application No. 19181467.2 (5 pages).

* cited by examiner

CHARGING CONTROL DEVICE AND METHOD

CROSS-REFERENCE TO RELATED APPLICATION

The present application claims priority to and the benefit of Korean Patent Application No. 10-2018-0097582 filed in the Korean Intellectual Property Office on Aug. 21, 2018, the entire content of which is incorporated herein by reference.

BACKGROUND

1. Field

Aspects of some example embodiments relate to a charging control device of a battery pack and a method thereof.

2. Description of the Related Art

A secondary battery cell operates as a cell for alternately repeating charging and discharging. The secondary cell may change chemical energy into electrical energy and may then be discharged, and when it is charged with electrical energy while it is discharged, it may store the energy in a chemical energy form again.

Rechargeable batteries are configured to operate as a battery pack in combination with a charging and discharging circuit, and charging caused by an external power source and discharging to an external load are performed through pack terminals of the battery pack.

Battery packs configured with lithium-ion (Li-ion) batteries, for example, may be charged by a constant current (CC)-constant voltage (CV) method, and may include a cell over voltage protection (COVP) function to prevent or reduce safety accidents.

The cell over voltage protection (COVP) function may operate when a cell voltage is equal to or greater than a fixed reference voltage. Accordingly, when the state of charge (SOC) of cells of a battery pack are imbalanced, overcharged cells may be generated, which may accelerate degradation of cell performance.

The above information disclosed in this Background section is only for enhancement of understanding of the background and therefore it may contain information that does not constitute prior art.

SUMMARY

Example embodiments of the present invention may include a charging control device and method for intercepting overcharging when a specific cell of a battery pack is degraded or an SOC among cells is imbalanced.

According to some example embodiments of the present invention, a charging control device includes: a battery state detector configured to detect a cell voltage of at least one cell of a battery and a charging current between the battery and a charging device; and a controller configured to perform a cell over voltage protection function on the battery based on a cell over voltage protection voltage, and to vary the cell over voltage protection (COVP) voltage in response to the charging current.

According to some example embodiments, the controller may calculate a correction value of the cell over voltage protection voltage in response to the charging current, and may correct the cell over voltage protection voltage by using the correction value.

According to some example embodiments, the controller may be driven in a first mode when a state in which a maximum value from among cell voltages of the at least one cell is equal to or greater than the cell over voltage protection voltage corrected by using the correction value is maintained for a predetermined time while the battery is charged, and the controller may perform the cell over voltage protection function based on a cell over voltage protection voltage corrected by using the correction value in the first mode.

According to some example embodiments, the controller may vary the correction value corresponding to the charging current when the charging current is equal to or greater than a full-charging current corresponding to a full-charging determining condition and is less than a charging current setting value in a constant current charging mode while driven in the first mode.

According to some example embodiments, the controller may set the correction value to be a first value when the charging current is equal to or greater than a charging current setting value in the constant current charging mode while driven in the first mode.

According to some example embodiments, the controller may set the correction value to be a second value that is greater than the first value when the charging current is less than the full-charging current while driven in the first mode.

According to some example embodiments, the controller may perform the cell over voltage protection function based on an initial setting value of the cell over voltage protection voltage while driven not in the first mode but in a second mode.

According to some example embodiments, the controller may be driven in the second mode when a maximum value from among cell voltages of the at least one cell is less than the cell over voltage protection voltage corrected by using the correction value.

According to some example embodiments, the controller may release the first mode and may be driven in the second mode when a maximum value from among cell voltages of the at least one cell becomes less than a predetermined threshold value while driven in the first mode.

According to some example embodiments, the controller may disable the first mode and may be driven in the second mode when a control signal or a control input for requesting to disable the first mode is received.

According to some example embodiments, the charging control device may further include a charging and discharging switch, wherein the controller may control the charging and discharging switch so as to intercept an electrical connection between the battery and the charging device when a maximum value of cell voltages of the at least one cell is equal to or greater than the cell over voltage protection voltage.

According to some example embodiments, the controller may control the charging and discharging switch so as to intercept an electrical connection between the battery and the charging device when the maximum value of cell voltages of the at least one cell is equal to or greater than a full-charging voltage and the charging current is equal to or greater than a full-charging current.

According to some example embodiment of the present invention, in a charging control method or a method for controlling charging of a battery pack, the method includes: detecting a cell voltage of at least one cell configuring a battery and a charging current between the battery and a charging device; varying a cell over voltage protection voltage in response to the charging current; and performing a cell over voltage protection function on the battery based on the cell over voltage protection voltage.

According to some example embodiments, the varying may include calculating a correction value of the cell over voltage protection voltage in response to the charging current; and correcting the cell over voltage protection voltage by using the correction value.

According to some example embodiments, the charging control method may further include driving in a first mode when a state in which a maximum value from among cell voltages of the at least one cell is equal to or greater than the cell over voltage protection voltage corrected by using the correction value is maintained for a predetermined time while the battery is charged.

According to some example embodiments, the performing of a cell over voltage protection function may include performing the cell over voltage protection function based on a cell over voltage protection voltage corrected by using the correction value while driven in the first mode.

According to some example embodiments, the performing of the cell over voltage protection function based on the corrected cell over voltage protection voltage may include: setting the correction value to be a first value when the charging current is equal to or greater than a charging current setting value in a constant current charging mode; reducing the correction value as the charging current increases when the charging current is equal to or greater than a full-charging current corresponding to a full-charging determining condition and is less than a charging current setting value in the constant current charging mode; and setting the correction value to be a second value that is greater than the first value when the charging current is less than the full-charging current.

According to some example embodiments, the performing of a cell over voltage protection function of the battery further may include performing the cell over voltage protection function based on an initial setting value of the cell over voltage protection voltage while driven not in the first mode but in a second mode.

According to some example embodiments, the charging control method may further include releasing the first mode and driving in the second mode when a maximum value from among cell voltages of the at least one cell becomes less than a predetermined threshold value while driven in the first mode.

According to some example embodiments, the performing of a cell over voltage protection function of the battery may include intercepting an electrical connection between the battery and the charging device when a maximum value of cell voltages of the at least one cell is equal to or greater than the cell over voltage protection voltage.

According to some example embodiments, the charging control method may further include intercepting an electrical connection between the battery and the charging device when a maximum value of cell voltages of the at least one cell is equal to or greater than a full-charging voltage and the charging current is equal to or greater than the full-charging current.

According to some example embodiments, generation of overcharging while a specific cell configuring a battery pack is degraded or an SOC among cells is imbalanced may be intercepted in advance.

DETAILED DESCRIPTION

Aspects of some example embodiments of the present invention will be described more fully hereinafter with reference to the accompanying drawings, in which aspects of some example embodiments of the invention are shown. As those skilled in the art would realize, the described embodiments may be modified in various different ways, all without departing from the spirit or scope of the present invention.

The drawings and description are to be regarded as illustrative in nature and not restrictive. Like reference numerals designate like elements throughout the specification. Therefore, the reference numerals of the constituent elements used in the previous drawings may be used for next drawings.

The size and thickness of each configuration shown in the drawings are arbitrarily shown for better understanding and ease of description, and the present invention is not limited thereto. The thickness of layers, films, panels, regions, etc., is exaggerated for clarity.

Electrically connecting two constituent elements includes directly connecting two constituent elements and connecting the same with another constituent element therebetween. The other constituent element may include a switch, a resistor, and a capacitor. When example embodiments are described, an expression of connection signifies electrical connection when an expressed of direct connection is not provided.

A charging control device and method according to some example embodiments will now be described with reference to accompanying drawings.

In the present specification, a cell represents each secondary cell, a battery indicates at least one cell that is combined in series or in parallel and is formed into a module, and a battery pack shows a battery that is provided into a case and is made into a package and it may include a battery management system (BMS).

Figure 1:
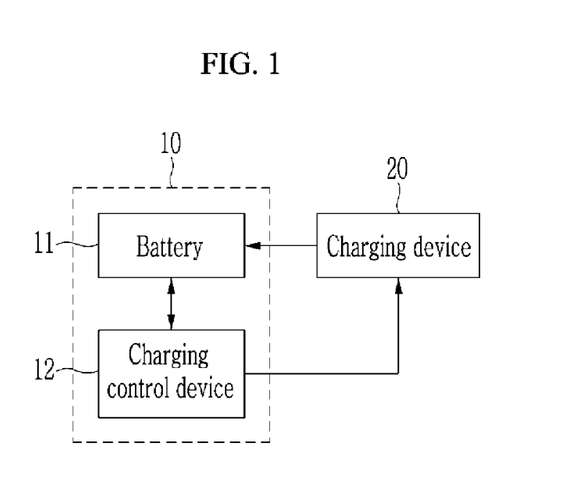
FIG. 1 shows a battery pack according to some example embodiments.
Figure 2:
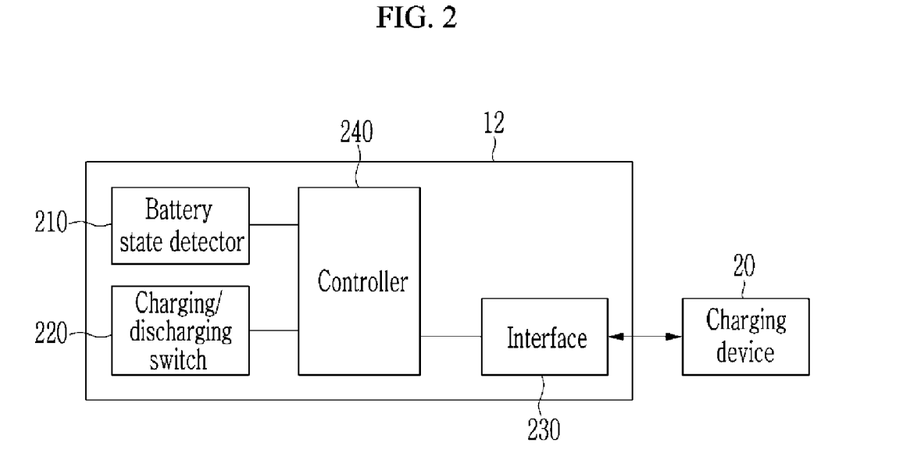
FIG. 2 shows a configuration diagram of a charging control device shown in FIG. 1.
Figure 3:
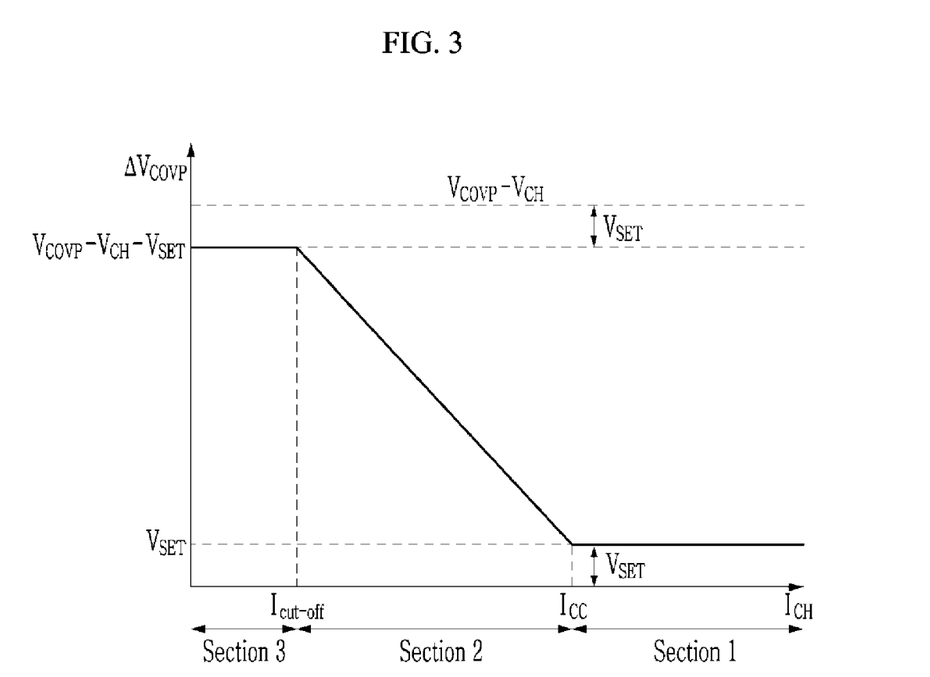
FIG. 3 shows an example for a battery pack according to some example embodiments to vary a charging ending voltage according to a charging current in a full-charging limit mode.

FIG. 1 shows a battery pack according to some example embodiments and FIG. 2 shows a configuration diagram of a charging control device shown in FIG. 1. FIG. 3 shows an example for a battery pack according to some example embodiments to vary a charging ending voltage according to a charging current in a full-charging limit mode.

Referring to FIG. 1, the battery pack 10 may include a battery 11 and a charging control device 12.

The battery 11 may be configured with one or more cells connected in series or in parallel to each other.

The charging control device 12 controls charging and discharging of the battery 11. The charging control device 12 may be provided, for example, inside a battery management system (BMS) of the battery pack 10.

Referring to FIG. 2, the charging control device 12 may include a battery state detector 210, a charging and discharging switch 220, an interface 230, and a controller 240.

The battery state detector 210 may continuously (or regularly, e.g., at predetermined intervals) detect information on states of the battery, such as a voltage, a current, or a temperature of the battery 11.

The charging and discharging switch 220 includes at least one switch connected between the battery 11 and pack terminals (e.g., positive and negative terminals) of the battery pack 10, and it may control a charging and discharging current flow between the battery 11 and an external device (a load or a charging device 20). That is, the charging and discharging switch 220 may electrically connect between the battery 11 and the external device to allow a charging and discharging current, or it may intercept an electrical connection between the battery 11 and the external device to intercept the charging and discharging current.

The interface 230 may perform an interface between the charging control device 12 and the external device, for example, the charging device 20.

According to some example embodiments, the controller 240 may control the entire operation of the charging control device 12.

The controller 240 may detect a cell voltage of each cell configuring the battery 11 through the battery state detector 210. For this, the battery state detector 210 may include a voltage detecting circuit connected to respective ends of each cell configuring the battery 11 and detecting a cell voltage of each cell. The controller 240 may detect a discharging current or a charging current flowing through a current path (referred to as a big current path hereinafter) between the battery 11 and the external device (e.g., a load or the charging device 20) through the battery state detector 210. For this, the battery state detector 210 may include a current detecting circuit for detecting a current flowing through the big current path.

The controller 240 may control charging of the battery 11 based on battery state information (a cell voltage or a charging current) obtained through the battery state detector 210. That is, the controller 240 compares battery state information and a full-charging condition, and when the state of the battery 11 satisfies the full-charging condition, it may control the charging and discharging switch 220 to intercept the electrical connection between the charging device 20 and the battery 11. The controller 240 may determine the state of the battery 11 to satisfy the full-charging state when the cell voltage of at least one cell configuring the battery 11 is equal to or greater than a reference voltage (hereinafter, a full charging voltage) for determining full-charging, and is equal to or less than a reference current (hereinafter, a full charging current) for determining whether the charging current between the battery 11 and the charging device 20 is full-charging.

The controller 240 may perform a cell over voltage protection (COVP) function based on the cell voltage acquired through the battery state detector 210. The controller 240 may control the charging and discharging switch 220 to intercept the electrical connection between the charging device 20 and the battery 11 when the cell voltage of at least one cell configuring the battery 11 is equal to or greater than a reference voltage (hereinafter, a cell over voltage protection (COVP) voltage) for determining overcharging.

The cell over voltage protection (COVP) voltage is variable by the state of the battery 11.

The controller 240 may use the established cell over voltage protection (COVP) voltage when the battery 11 is charged in the conventional charging mode (hereinafter, a normal mode). That is, the controller 240 may use the cell over voltage protection (COVP) voltage as an initially set value when the battery 11 is charged in a normal mode. Here, the normal mode contrasts with a full-charging limit mode to be described, and it represents a mode for performing a cell over voltage protection (COVP) function by using a fixed cell over voltage protection (COVP) voltage regardless of the charging current.

The controller 240 may, when the battery 11 is charged in the full-charging limit mode, vary the cell over voltage protection (COVP) voltage based on the charging current of the battery 11. Here, the full-charging limit mode is a charging mode according to some example embodiments, and it represents a mode for performing a cell over voltage protection (COVP) function by using not the fixed cell over voltage protection (COVP) voltage but the cell over voltage protection (COVP) voltage variable by the charging current.

The controller 240 may enter the full-charging limit mode when a maximum value ($V_{CMax}$) from among the cell voltages of the battery 11 satisfies Equation 1 for more than a predetermined amount of time (e.g., 30 seconds) while the charging current ($I_{CH}$) flows (i.e., $I_{CH}>0$).

$$V_{CMax}=V_{COVP}\Delta V_{COVP} \qquad \text{Equation 1}$$

In Equation 1, $V_{COVP}$ is a cell over voltage protection (COVP) voltage (or an initial setting value of the cell over voltage protection voltage) in the normal mode, and a fixed value may be used regardless of the charging current ($I_{CH}$). Further, $\Delta V_{COVP}$ is a correction value of the cell over voltage protection (COVP) voltage and it is variable by the charging current ($I_{CH}$).

Referring to FIG. 3, the correction value ($\Delta V_{COVP}$) of the cell over voltage protection (COVP) voltage may be set to satisfy Equation 2 in a first section.

$$I_{CH}=I_{CC}: \Delta V_{COVP}=V_{SET} \qquad \text{Equation 2}$$

In Equation 2, $I_{CC}$ is a fixed value, and it may be a charging current value that is set to be supplied to the battery 11 from the charging device 20 when the battery 11 is charged in a constant current (CC) charging mode. $I_{CC}$ may be received from the charging device 20 through the interface 230. $V_{SET}$ is a fixed value, and it may be a value for limiting a minimum value of $\Delta V_{COVP}$. $V_{SET}$ may be differently set according to a design specification of the battery 11. For example, $V_{SET}$ may be 10 mV.

Referring to Equation 2, the first section represents a section in which the charging current is equal to or greater than $I_{CC}$, and the state in which the battery 11 is charged in the CC charging mode may be included in the section.

Referring to FIG. 3, the correction value ($\Delta V_{COVP}$) of the cell over voltage protection (COVP) voltage may be set to satisfy Equation 3 or Equation 4 in the second section.

$$I_{cut\text{-}off}\leq I_{CH}<I_{CC}: \Delta V_{COVP}=G1\times(I_{CH}-I_{cut\text{-}off})+V_{SET}$$
$$G1=(V_{SET}-(V_{COVP}-V_{CH}-V_{SET}))/(I_{CC}-I_{cut\text{-}off}) \qquad \text{Equation 3}$$

$$I_{cut\text{-}off}\leq I_{CH}<I_{CC}: \Delta V_{COVP}=(V_{COVP}-V_{CH}-V_{SET})-(G2\times(I_{CH}-I_{cut\text{-}off})) \; G2=((V_{COVP}-V_{CH}-V_{SET})-V_{SET})/(I_{CC}-I_{cut\text{-}off}) \qquad \text{Equation 4}$$

In Equations 3 and 4, G1 and G2 correspond to a change rate (e.g., a slope of the correction value ($\Delta V_{COVP}$) in the second section) of the correction value ($\Delta V_{COVP}$) according to the charging current in the second section, G1=−G2. $V_{CH}$ is a fixed value, and it may be a charging voltage value that is set to be applied to the battery 11 from the charging device 20 when the battery 11 is charged in the constant voltage (CV) charging mode. That is, it may be the maximum charging voltage value that may be applied to the battery 11 by the charging device 20. $V_{CH}$ may be received from the charging device 20 through the interface 230.

Referring to Equation 3, the second section represents a section in which the charging current ($I_{CH}$) is equal to or greater than a full-charging current ($I_{cut\text{-}off}$) and is less than $I_{CC}$ that is a charging current value in the CC charging mode, and the section in which the battery 11 is charged in the CV charging mode may be included in the section.

Referring to FIG. 3, the correction value ($\Delta V_{COVP}$) of the cell over voltage protection (COVP) voltage may be set to satisfy Equation 5 in the third section.

$$I_{CH} < I_{cut\text{-}off}: \Delta V_{COVP} = V_{COVP} - V_{CH} - V_{SET} \qquad \text{Equation 5}$$

Referring to Equation 5, the third section represents a section in which the charging current ($I_{CH}$) is less than a full-charging current ($I_{cut\text{-}off}$), and a portion after the full-charging may be included in the third section.

When the maximum value ($V_{CMax}$) satisfies Equation 1 and the controller 240 enters the full-charging limit mode, the controller 240 may limit the cell over voltage protection (COVP) voltage by using the correction value ($\Delta V_{COVP}$) calculated with reference to Equations 2 to 5.

The controller 240 may calculate the cell over voltage protection (COVP) voltage ($V_{FCL}$) by using Equation 6 when it is operated in the full-charging limit mode.

$$V_{FCL} = V_{COVP} - \Delta V_{COVP} \qquad \text{Equation 6}$$

Referring to Equation 6, when the controller 240 enters the full-charging limit mode, it may use a value that is lowered than the cell over voltage protection (COVP) voltage ($V_{COVP}$) in the normal mode by the correction value ($\Delta V_{COVP}$) as a cell over voltage protection (COVP) voltage ($V_{FCL}$).

The controller 240 may disable (or release) the full-charging limit mode and it may be operated in the normal mode when it is requested to disable the full-charging limit mode by a control signal received through a communication with an external device or a control input provided through an input device.

Further, the controller 240 may disable (or release) the full-charging limit mode and may be operated in the normal mode when the maximum value ($V_{CMax}$) from among the cell voltages of the battery 11 satisfies Equation 7 for more than a predetermined amount of time (e.g., 30 seconds).

$$V_{CMax} \leq V_{RST} \qquad \text{Equation 7}$$

In Equation 7, $V_{RST}$ is a fixed value, and it is a threshold value for determining whether cells have entered a stabilization state such that the full-charging limit mode may be released.

Regarding the charging control device 12, respective functions of the controller 240 may be performed by a processor realized with at least one central processing unit (CPU), a chipset, a micro controller unit (MCU), or a microprocessor.

Figure 4:
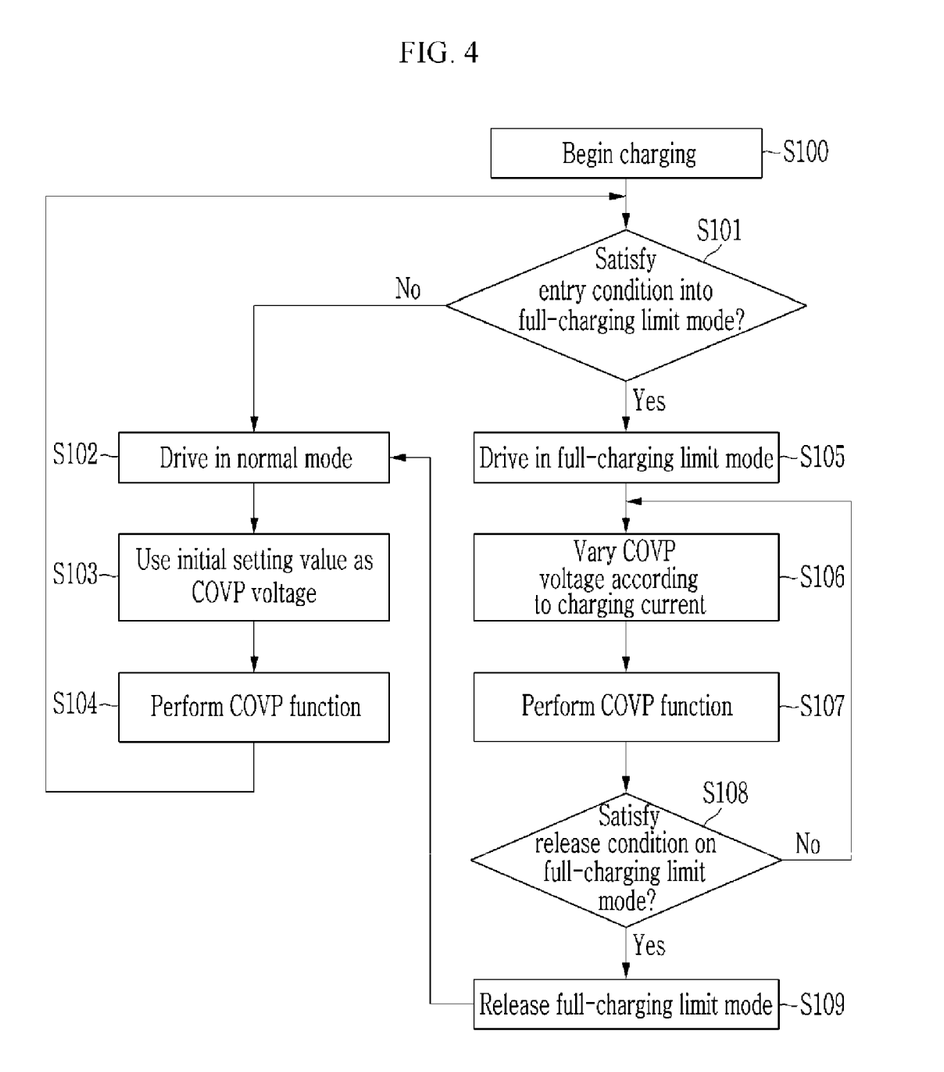
FIG. 4 shows a method for controlling charging of a battery pack according to some example embodiments.

FIG. 4 shows a method for controlling charging of a battery pack according to some example embodiments. The charging controlling method of FIG. 4 may be performed by the charging control device described with reference to FIG. 1 and FIG. 2.

Referring to FIG. 4, when a charging starts (S100), the charging control device 12 determines whether or not to enter the full-charging limit mode based on battery state information (S101).

At S101, the charging control device 12 may enter the full-charging limit mode when the maximum value ($V_{CMax}$) from among the cell voltages of the battery 11 satisfies Equation 1 for more than a predetermined time (e.g., 30 seconds) while a charging is progressed ($I_{CH} > 0$). Here, when it is requested to disable the full-charging limit mode by the control signal or the control input received from the outside, the charging control device 12 may disable the full-charging limit mode although the cell voltage of the battery 11 satisfies Equation 1.

At S101, when the state of the battery 11 fails to satisfy a full-charging limit mode entering condition, the charging control device 12 is driven in the normal mode (S102). When driven in the normal mode, the charging control device 12 maintains the cell over voltage protection (COVP) voltage as an initial setting value (S103), and performs a cell over voltage protection (COVP) function based on the cell over voltage protection (COVP) voltage set as an initial setting value (S104).

On the contrary, at S101, when the state of the battery 11 satisfies the full-charging limit mode entering condition, the charging control device 12 is driven by the full-charging limit mode (S105). When driven in the full-charging limit mode, the charging control device 12 varies the cell over voltage protection (COVP) voltage according to the charging current measured in real-time (S106), and it performs a cell over voltage protection (COVP) function based on the cell over voltage protection (COVP) voltage variable by the charging current (S107).

At S106, the charging control device 12 may calculate a correction value ($\Delta V_{COVP}$) for correcting the cell over voltage protection (COVP) voltage according to the charging current, and may subtract the same from the initial setting value ($V_{COVP}$) of the cell over voltage protection (COVP) voltage to vary the cell over voltage protection (COVP) voltage. Referring to FIG. 3, in the first section in which the charging current ($I_{CH}$) is equal to or greater than $I_{CC}$ that is a charging current value in the CC charging mode, the charging control device 12 may set the correction value ($\Delta V_{COVP}$) of the cell over voltage protection (COVP) voltage to be a fixed voltage value ($V_{SET}$) as expressed in Equation 2. In the second section in which the charging current ($I_{CH}$) is equal to or greater than the full-charging current ($I_{cut\text{-}off}$) and is less than $I_{CC}$ that is a charging current value in the CC charging mode, the charging control device 12 may set the correction value ($\Delta V_{COVP}$) so that the value may reduce as the charging current ($I_{CH}$) increases as expressed in Equations 3 or 4. In the third section in which the charging current ($I_{CH}$) is less than the full-charging current ($I_{cut\text{-}off}$), the charging control device 12 may set the fixed value ($V_{COVP} - V_{CH} - V_{SET}$) as the correction value ($\Delta V_{COVP}$) as expressed in Equation 5.

The charging control device 12 may release the full-charging limit mode (S109) and may be driven in the normal mode when the release condition on the full-charging limit mode is satisfied (S108) while driven in the full-charging limit mode.

At S108, the charging control device 12 may disable the full-charging limit mode when the cells configuring the battery 11 are stabilized and the cell voltages of the battery 11 satisfy Equation 7.

At S108, the charging control device 12 may disable the full-charging limit mode when it receives a control signal or a control input for requesting to disable the full-charging limit mode.

According to some example embodiments of the present invention, when a specific cell configuring the battery 11 is degraded or the state of charge (SOC) among cells is imbalanced, the cell over voltage protection (COVP) voltage is set to be linked to the charging current in real-time, thereby preventing or reducing generation of overcharging in advance.

The accompanying drawings and the example embodiments of the present invention are only examples of the present invention, and are used to describe aspects of some example embodiments of the present invention but not to limit the scope of the present invention as defined by the following claims and their equivalents. It will be understood by those of ordinary skill in the art that various modifications and equivalent embodiments may be made. Therefore, the technical scope of the present invention may be defined by the technical idea of the following claims and their equivalents.

What is claimed is:

1. A charging control device comprising:
a battery state detector that is configured to detect cell voltages of at least one cell of a battery and a charging current between the battery and a charging device; and
a controller that is configured to perform a cell over voltage protection (COVP) function on the battery based on a cell over voltage protection voltage, wherein the controller is configured to control the cell over voltage protection voltage to be fixed during a second mode and to vary the cell over voltage protection voltage in response to the charging current during a first mode,
wherein the controller is further configured to calculate a correction value of the cell over voltage protection voltage in linkage with the charging current, and to correct the cell over voltage protection voltage by using the correction value, and
wherein the controller is further configured to vary the correction value corresponding to the charging current when the charging current is equal to or greater than a full-charging current corresponding to a full-charging determining condition and is less than a charging current setting value in a constant current charging mode while driven in the first mode.

2. The charging control device of claim 1, wherein
the controller is configured to be driven in the first mode when a state in which a maximum value from among the cell voltages of the at least one cell is equal to or greater than the cell over voltage protection voltage corrected by using the correction value is maintained for a predetermined time while the battery is charged, and the controller is configured to perform the cell over voltage protection function based on a cell over voltage protection voltage corrected by using the correction value in the first mode.

3. The charging control device of claim 2, wherein
the controller is configured to perform the cell over voltage protection function based on an initial setting value of the cell over voltage protection voltage while driven in the second mode different from the first mode.

4. The charging control device of claim 3, wherein
the controller is configured to be driven in the second mode when a maximum value from among the cell voltages of the at least one cell is less than the cell over voltage protection voltage corrected by using the correction value.

5. The charging control device of claim 3, wherein
the controller is configured to release the first mode and is configured to be driven in the second mode when a maximum value from among the cell voltages of the at least one cell becomes less than a predetermined threshold value while driven in the first mode.

6. The charging control device of claim 3, wherein
the controller is configured to disable the first mode and is configured to be driven in the second mode when a control signal or a control input for requesting to disable the first mode is received.

7. The charging control device of claim 1, wherein
the controller is configured to set the correction value to be a first value when the charging current is equal to or greater than a charging current setting value in the constant current charging mode while driven in the first mode.

8. The charging control device of claim 7, wherein
the controller is configured to set the correction value to be a second value that is greater than the first value when the charging current is less than the full-charging current while driven in the first mode.

9. The charging control device of claim 1, further comprising
a charging and discharging switch,
wherein the controller is configured to control the charging and discharging switch so as to intercept an electrical connection between the battery and the charging device when a maximum value of the cell voltages of the at least one cell is equal to or greater than the cell over voltage protection voltage.

10. The charging control device of claim 9, wherein
the controller is configured to control the charging and discharging switch so as to intercept an electrical connection between the battery and the charging device when the maximum value of the cell voltages of the at least one cell is equal to or greater than a full-charging voltage and the charging current is equal to or greater than a full-charging current.

11. A method for controlling charging of a battery pack, the method comprising:
detecting cell voltages of at least one cell of a battery and a charging current between the battery and a charging device;
controlling a cell over voltage protection voltage to be fixed during a second mode;
varying the cell over voltage protection voltage in response to the charging current during a first mode; and
performing a cell over voltage protection function on the battery based on the cell over voltage protection voltage,
wherein the varying includes calculating a correction value of the cell over voltage protection voltage in response to the charging current; and
correcting the cell over voltage protection voltage based on the correction value,
wherein the calculating the correction value includes:
setting the correction value to be a first value when the charging current is equal to or greater than a charging current setting value in a constant current charging mode;
reducing the correction value as the charging current increases when the charging current is equal to or greater than a full-charging current corresponding to a full-charging determining condition and is less than a charging current setting value in the constant current charging mode; and
setting the correction value to be a second value that is greater than the first value when the charging current is less than the full-charging current.

12. The charging control method of claim 11 further comprising
driving in the first mode when a state in which a maximum value from among the cell voltages of the at least one cell is equal to or greater than the cell over voltage protection voltage corrected by using the correction value is maintained for a predetermined time while the battery is charged, wherein the performing of a cell over voltage protection function includes performing the cell over voltage protection function based on a cell over voltage protection voltage corrected by using the correction value while driven in the first mode.

13. The charging control method of claim 12, wherein the performing of a cell over voltage protection function of the battery further includes performing the cell over voltage protection function based on an initial setting value of the cell over voltage protection voltage while driven in the second mode different from the first mode.

14. The charging control method of claim 13, further comprising releasing the first mode and driving in the second mode when a maximum value from among the cell voltages of the at least one cell becomes less than a predetermined threshold value while driven in the first mode.

15. The charging control method of claim 11, wherein the performing of a cell over voltage protection function of the battery includes intercepting an electrical connection between the battery and the charging device when a maximum value of the cell voltages of the at least one cell is equal to or greater than the cell over voltage protection voltage.

16. The charging control method of claim 11, further including intercepting an electrical connection between the battery and the charging device when a maximum value of the cell voltages of the at least one cell is equal to or greater than a full-charging voltage and the charging current is equal to or greater than a full-charging current.

\* \* \* \* \*